Nov. 4, 1958
W. H. ROWAND
2,858,808
METHOD OF OPERATING A SUPERCRITICAL
PRESSURE VAPOR GENERATOR
Filed April 8, 1954
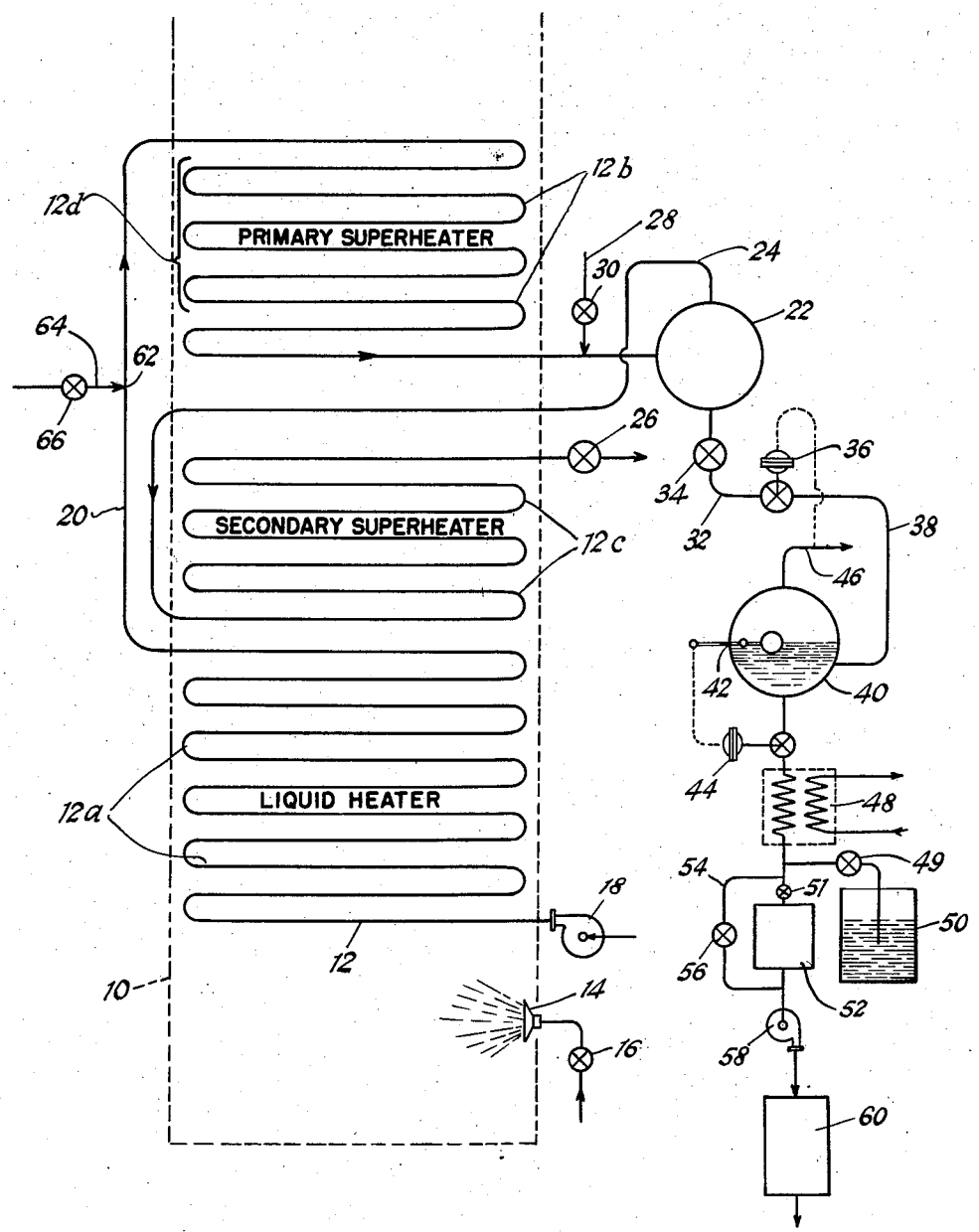
INVENTOR
*Will H. Rowand*
BY
*J. P. Moran*
ATTORNEY

United States Patent Office 2,858,808
Patented Nov. 4, 1958

2,858,808

METHOD OF OPERATING A SUPERCRITICAL PRESSURE VAPOR GENERATOR

Will H. Rowand, Short Hills, N. J., assignor to The Babcock & Wilcox Company, New York, N. Y., a corporation of New Jersey Application April 8, 1954, Serial No. 421,796

2 Claims. (Cl. 122—379)

The present invention relates in general to the operation of forced flow once-through vapor generating units designed for the production of superheated vapor at pressures and temperatures in excess of the critical values.

A supercritical pressure steam generator, for example, is understood to be a steam generator in which the working medium is converted from water to steam at pressures above the critical value of 3206 p. s. i. a. At these pressures, water is converted to steam by the application of heat in a process which involves only the addition of sensible heat; there is no heat of vaporization. For this reason water after being delivered to a heated flow conduit at a supercritical pressure and being further heated, its temperature continues to rise until steam issued from the discharge end of the conduit at a predetermined temperature which will be above the critical temperature of 705° F. At no time during the heating of the water and its conversion to steam is the temperature of the fluid constant, as would be the case if the heating process were carried out below the critical pressure. Theoretically, if a fluid is subjected to a pressure above its critical and to a temperature above its critical, the fluid should be in a gaseous state.

In the portion of the conduit in which the fluid temperature ranges from 700–850° F., there is usually a scale formed on the internal wall surface. Such scale may be formed by deposition of solids in solution or suspension in the heated fluid or by chemical action between the fluid and the metal wall of the fluid heating conduit. This scale formation on the heating surface may seriously impair the mechanical integrity of the fluid-containing conduit by elevating its wall temperature, because the scale creates additional resistance to heat flow through the wall.

The main object of this invention is to provide a method of removing the scale formation in such vapor generators without materially reducing the vapor output therefrom, by periodically reducing the operating pressure of the steam generator to below the critical pressure and causing an increase in liquid contact to flow through the portion of the conduit having a scale formation therein and pick up particles of scale therefrom. The scale-carrying liquid is subsequently separated from the vapor.

A further object of this invention is to provide a scale removal method in which the increase in liquid content passing over the scale may be caused by the injection of scale-removing liquid into the flow conduit ahead of the scale-forming portion of the conduit.

Another object is to provide a method of removing a scale formation substantially as described above with the additional step of washing the scale-carrying steam as leaves the scale-forming portion of the conduit during the initial portion of each of the pressure reducing periods.

It has been found that the increase of liquid flow over the scale may be accomplished either by using the working medium, water, or injecting a special cleaning liquid, such as caustic soda dissolved in water. The type of cleaning fluid used varies with the kind of scale which is encountered.

The various features of novelty which characterize the invention are pointed out with particularity in the claims annexed to and forming a part of this specification. For a better understanding of the invention, its operating advantages aand specific objects attained by its use, reference should be had to the accompanying drawing and descriptive matter in which I have illustrated and described a preferred embodiment of my invention.

The accompanying drawing is a schematic diagram of a once-through supercritical pressure steam generator operable in accordance with the invention.

The steam generator 10 is shown with a single fluid heating conduit 12, but it is well known that a plurality of such conduits arranged in parallel can be used. The steam generator is fired by a fuel burner 14, the fuel supply to which is controlled by a valve 16. The fluid heating conduit is composed of three heating zones or sections, i. e. the liquid heater section 12a, a primary superheater section 12b and a secondary superheater section 12c. The sections are arranged for serial flow of fluid therethrough, the liquid heater section being also arranged for a fluid flow therethrough generally concurrent to the flow of heating gases relative to the fluid heating conduits, the primary superheater counter-current, and the secondary superheater concurrent. Water at a supercritical pressure, e. g. 5000 p. s. i., is fed to the liquid heater section 12a by a feed pump 18. The water is heated in the liquid heater section to a temperature of about 680° F., whereupon it is conducted out of contact wtih the upflowing heating gases to the inlet end of the primary superheater section 12b by an external transfer line 20. Shortly after entering the superheater 12b, the fluid reaches the critical temperature (705° F.) of water. As the fluid continues to be heated, it reaches a temperature of about 1100° F. The scale-forming zone occurs where the heated fluid is at a temperature between approximately 700° F. and 850° F. There is normally at supercritical pressure a scale forming zone which occurs in the zone generally indicated by the bracket 12d.

In accordance with the present invention, the steam upon leaving the primary superheater 12b is discharged into an elevated drum 22 adapted to serve as a steam and water separator. During normal supercritical pressure operation of the unit, superheated steam merely flows through the drum 22 and a steam line 24 from the primary superheater to the secondary superheater 12c where the steam is further heated to its delivery temperature for use in a prime mover positioned beyond the outlet valve 26. The outlet valve may be a turbine throttle valve which is regulated to maintain a predetermined steam outlet pressure. The speed of the feed pump 18 determines the fluid flow rate through the fluid heating conduit. The combination of the regulation of the burner control valve 16, the output of the pump 18, and the position of the outlet valve 26 sets the steam generator operating conditions. If the steam load on the generator is to be increased, the output of the pump 18 and the fuel supply to the burner 14 are increased, while the outlet valve 26 is controlled to maintain a constant steam pressure in accordance with the increased flow rate.

Heretofore it has been the practice, in cleaning below critical pressure once-through boiler units which discharge superheated steam directly to a prime mover, to reduce the steam generation rate to increase the ratio of water to steam in the normal conversion zone, thus providing a flushing liquid for scale removal in that zone, and to bypass the prime mover by dumping the superheated steam and scale in suspension into a condenser during the cleaning operation. The prime mover is usually a large capacity turbine requiring a considerable amount of cooling-down and warming-up time when it is removed from service, and this by-passing of the prime mover results in the loss of a large block of power.

In the operation of a once-through steam boiler at pressures above the critical, the presence or introduction of a flushing liquid in the scale-forming zone would effect the removal of scale therefrom, but in view of the lack of density difference between the liquid and vapor at supercritical pressures, there would be no effective method of separating the scale-carrying liquid from the system and the scale would tend to be again deposited when the carrier liquid was vaporized. Under such conditions it would be necessary to discharge the mixture of steam and carrier liquid from the fluid heating system, thus cutting off the supply of vapor to the prime mover.

In accordance with the present invention, the scale-carrying liquid is effectively removed from the fluid heating system of a supercritical pressure steam boiler without cutting off the supply of vapor to the prime mover, by reducing the operating pressure of the boiler to a value considerably below the critical pressure, e. g. 2600 p. s. i., during the cleaning period and providing means for separating the scale-carrying liquid from the vapor and from the system on leaving the scale-forming zone. The vapor generator can continue to supply superheated vapor to the prime mover during the cleaning period, thus eliminating the loss of power which would otherwise be entailed if the prime mover had to be taken out of service during the cleaning period.

When cleaning of the vapor generator is scheduled, the first step is to reduce the operating pressure from 4500 p. s. i. to about 2600 p. s. i., for example. This pressure reduction is accomplished by opening the valve 26 wtih the feed pump 18 delivering a constant output until the pressure has been reduced, yet maintaining the designed steam outlet temperature of 1100° F., for example. The reduction in operating pressure to 2600 p. s. i. changes conditions within the fluid heating conduit so that there will be a mixture of steam and water in the liquid heater section 12a. Further heating of the mixture evaporates the water with the result that all the water is evaporated by the time the steam leaves the primary superheater section 12b. The steam is then passed through the separator drum 22 and secondary superheater before being delivered to the prime mover.

As soon as the operating pressure reaches 2600 p. s. i., the fuel burning rate at the burner 14 is reduced by controlling the fuel valve 16. This reduced firing rate will cause the conversion zone to move out of the liquid heater 12a, up the connecting line 20, and into the primary superheater 12b. When operating below the critical pressure, the conversion zone is where the final liquid is evaporated from the vapor-liquid mixture. The term "conversion zone" is not applied herein to the operation of the unit at pressures above the critical pressure because the exact temperature at which the supercritical pressure fluid changes from one having liquid characteristics to one acting as a vapor is not known precisely.

During the time that the conversion zone is moving downstream from the liquid heater section, relatively pure wash water from a supply line 28, by controlling the valve 30, is injected into the stream as it leaves the primary superheater 12b. This wash water serves a double purpose of reducing the steam temperature entering the separator 22 and washing the suspended scale particles out of the steam where they are entrapped in the liquid. The liquid is then removed by mechanical or gravitational action in the separator drum 22.

When the conversion zone at subcritical pressure operation has shifted until a vapor-liquid scale-carrying mixture enters the separator drum, the firing rate is steadied out, and the wash water flow is stopped. The movement of the conversion zone up to the separator causes the primary superheater 12b and the scale-forming zone 12d to become cleaned by the flushing effect of the increased liquid content of the working fluid. This water picks up scale particles and carries them to the separator drum 22, where the steam is separated from the water and flows to the secondary superheater 12c. The scale-carrying water is drained out of the separator drum through the line 32 and valve 34 and is reduced to about 5 p. s. i. pressure by the pressure reducer 36 which is controlled by the pressure in the receiving tank 40. When the water is reduced in pressure, a certain amount flashes into steam. The steam-water mixture is then conducted through line 38 into a flash receiver tank 40, which is kept partially filled to a predetermined level by a water level controller 42 operating a blow-down valve 44 to discharge excess water. Because of the water level in the receiver tank 40, the steam separated from the water passes out through a conduit 46 to the prime mover main condenser (not shown).

The scale-carrying water discharged through the blow-down valve 44 is cooled to about 100° F. in a surface cooler 48 and is delivered either through a control valve 49 to a dirty water storage tank 50 or through a control valve 51 to a water purifier 52. The amount of water purified is controlled by the valve 51 and a by-pass pipe 54 having a valve 56. The purifier 52 may be any well-known type of deionizer. The purified water is pumped from the purifier 52 by a low pressure pump 58 and delivered to a feed water storage tank 60. After reaching the feed storage tank the water may be subjected to other power plant treatment prior to being returned to the vapor generator by the feed pump 18.

The reduced pressure operation of the vapor generator is continued until it is determined by any conventional means, such as monitoring the tube temperature of the scale-forming zone, that the heat transfer surfaces therein are internally cleaned. When the unit is cleaned the drain valve 34 is closed, thus securing the drain system from the separator drum 22. The boiler outlet valve 26 is then partly closed until the boiler pressure reaches the supercritical pressure of 4500 p. s. i. The fuel control valve 16, is operated to increase the firing rate until the normal steam temperature is reached. The operator would then by operating outlet valve 26, controlling output of the feed pump 18, and controlling the rate of fuel delivery at the valve 16, increase the boiler load to whatever may be desired.

The boiler cleaning operation described consists essentially of reducing the pressure of the vapor generator to a below critical pressure and subjecting the scale-forming portion of the vapor generator to a scale-removing action while maintaining the delivery of heated vapor to the prime mover. The scale-removing action consists of increasing the liquid content of the fluid entering the scale-forming portion of the vapor generator, and then separating the scale-carrying liquid from the vapor for further treatment or disposal.

The increase in liquid content of the fluid flowing through the scale-forming portion of the vapor generator surfaces may be accomplished or supplemented by injecting a special scale-removing liquid, such as a caustic soda solution, at a position 62 in the conduit 20 between the liquid heater section 12a and the primary superheater 12b. The cleaning liquid is put into the conduit 20 through an injection line 64 and control valve 66 as such a rate as to cause the conversion from a steam-water mixture to 100 percent steam to enter the separator drum 22 while the vapor generator is operating at 2600 p. s. i. pressure. The scale-carrying liquid would then be disposed of through the drain system of the separator drum as previously described above.

While in accordance with the provisions of the statutes I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. In the method of operating a supercritical pressure vapor generator which comprises supplying a vaporizable fluid to a conduit under variable conditions of fluid flow rate and heat input to said fluid, selectively varying at least one of said conditions to cause superheated vapor to issue from said conduit with resultant formation of scale in a portion of said conduit, and delivering said superheated vapor at supercritical pressure to a prime mover, the improvement comprising the steps of periodically reducing the operating pressure of said fluid from a value above the critical pressure to a predetermined value below the critical pressure while maintaining the delivery of superheated vapor to a prime mover, selectively varying at least one of said conditions of heat input and fluid flow to cause a vapor-liquid mixture to flow into said scale forming portion of said conduit during the initial portion of the reduced pressure period, said mixture having a sufficient liquid content to pick up scale therein during said reduced pressure periods, completing the vaporization of said mixture, introducing a relatively pure vaporizable liquid into said vapor during said initial portion of said reduced pressure period to wash any entrained solid from said vapor, and removing said washing liquid from said vapor generator.

2. In the method of operating a supercritical pressure vapor generator which comprises supplying a vaporizable fluid to a conduit under variable conditions of fluid flow rate and heat input to said fluid, selectively varying at least one of said conditions to cause superheated vapor to issue from said conduit with resultant formation of scale in a portion of said conduit, and delivering said superheated vapor at supercritical pressure to a prime mover, the improvement comprising the step of periodically reducing the operating pressure of said fluid from a value above the critical pressure to a predetermined value below the critical pressure while maintaining the delivery of superheated vapor to a prime mover, selectively varying at least one of said conditions of heat input and fluid flow to cause a vapor-liquid mixture to flow into said scale forming portion of said conduit during the initial portion of the reduced pressure period, said mixture having a sufficient liquid content to pick up scale therein during said reduced pressure periods, completing the vaporization of said mixture, introducing a relatively pure vaporizable liquid into said vapor during said initial portion of said reduced pressure period to wash any entrained solid from said vapor, selectively varying one of said conditions of heat input and fluid flow to cause the vapor-liquid mixture to advance through said scale forming zone and pick up and carry the scale in the liquid for transport to a vapor separating zone during said reduced pressure period, and separating the scale carrying liquid and washing liquid from the vapor during said reduced pressure periods.

References Cited in the file of this patent

UNITED STATES PATENTS

| 1,925,222 | Abendroth | Sept. 5, 1933 |
| 1,942,861 | Huster | Jan. 9, 1934 |
| 2,028,504 | Egloff | Jan. 21, 1936 |
| 2,032,924 | Eule | Mar. 3, 1936 |

FOREIGN PATENTS

| 441,278 | Great Britain | Jan. 16, 1936 |

OTHER REFERENCES

"Technical Thermodynamics," volume II (Zeuner). Published by D. Van Nostrand Co. (N. Y.) (pages 205 and 207 relied on).